Nov. 18, 1924.                                              1,515,849
                        L. J. EPPINGER
                        CASTING LURE
                     Filed Feb. 17, 1923

Inventor
Louis J. Eppinger,
By
                        Attorneys

Patented Nov. 18, 1924.

1,515,849

UNITED STATES PATENT OFFICE.

LOUIS J. EPPINGER, OF DETROIT, MICHIGAN.

CASTING LURE.

Application filed February 17, 1923. Serial No. 619,609.

*To all whom it may concern:*

Be it known that I, LOUIS J. EPPINGER, a citizen of the United States of America, residing at Detroit, in the county of Wayne and State of Michigan, have invented certain new and useful Improvements in Casting Lures, of which the following is a specification, reference being had therein to the accompanying drawings.

This invention relates to a casting lure and one of the objects of my invention is to furnish a lure with interchangeable hooks held by a novel fastening device protected by a guard which prevents a spoon or like device from accidentally releasing the hook.

Another object of this invention is to furnish a lure having a detachable hook with a guard or spoon, the relative arrangement of said guard and spoon being such that the guard will not interfere with the spinning action of the spoon nor the spoon permitted to become entangled with the hook.

A further object of this invention is to provide novel means for connecting a hook to a lure by which hooks can be easily changed and securely held without any danger of weeds rendering such means inoperative. The hook securing means also prevents the spoon or like device from interfering with the bait, fly or other device on the hook, and the arrangement of parts is such that the lure may be safely carried without any danger of a hook or spoon becoming displaced.

The above are a few of the objects attained by the novel construction to be hereinafter described and reference will now be had to the drawing wherein—

Figure 2:
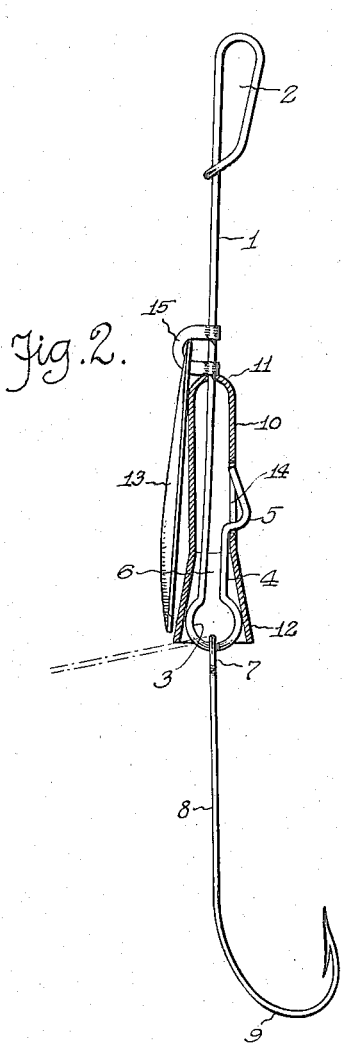
Fig. 2 is an enlarged elevation of the casting lure provided with an ordinary hook and showing the guard in longitudinal section.
Figure 1:
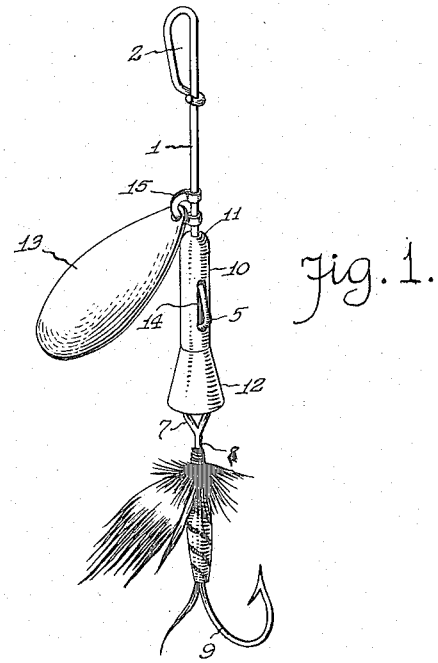
Figure 1 is a perspective view of the casting lure provided with a fly hook.
Figure 3:
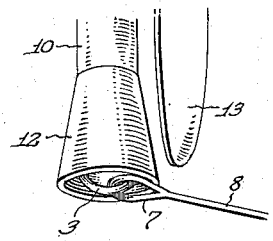
Fig. 3 is a perspective view of a portion of the lure showing how the guard limits the action of the lure.

The casting lure comprises a rod-like member 1 having its inner end bent to form a loop or eye 2 to which a line or leader may be attached. The outer end of the member 1 is provided with a return bend forming an open eye 3 and a leg or bill 4 terminating in a catch 5. The formation of the open eye 3 is such as to lend resiliency to the leg or bill 4 and permit of the catch 5 being sprung to and from the member 1. With the leg or bill 4 disposed in parallelism with the outer end of the member 1 there is a long entrance or passage 6 into the eye 3.

The leg or bill 4 permits of the eye 7 of an ordinary hook 8 or fly hook 9 being threaded on the outer end of the member 1 to be loosely held on the eye 3.

Prior to the formation of the loop 2 of the member 1 a tubular guard 10 is slidably mounted on the member 1, said guard and member being made of metal that will not easily corrode. The inner end of the tubular guard 10 is rounded off and partially closed, as at 11, about the member 1 and the outer end of the tubular guard is flared or bell shaped, as at 12, to receive or fit over the eye 3 and form an annular abutment for the shank of the hook 8 or 9 and prevent the hook from swinging rearwardly and interfering with the member 1 or a spoon 13 or like device carried by the member 1.

The tubular guard 10, intermediate its ends, has a longitudinal slot 14 which permits the guard to serve as a keeper for the catch 5, said catch protruding through the slot 14 and holding the guard 10 at the outer end of the member 1, so that when casting or encountering weeds, obstacles and the like the guard 10 cannot accidentally shift relative to the member 1. The guard also serves as a closure for the entrance or passage 6 to the eye 3 and since the guard is retained at the outer end of the member 1 as an abutment for the hook 8 or 9, it is obvious that the eye 7 of the hook cannot be shifted into the entrance of the passage 6 until the guard is retracted. This can be only accomplished by pressing inwardly on the catch 5 and shifting the guard towards the loop 2. It is apparent that the inclination of the catch 5 and the flared end 12 of the guard 10 will facilitate shifting the guard 10 on to the catch so that said guard may serve as a keeper for the catch.

The spoon 13 is loosely connected to the clevis 15, swivel or other member slidable and loose about the member 1 and the arrangement of the spoon is such that it will contact with either the inner or outer end of the guard 10, when inactive, without such pressure on the catch 5 as to cause the same to open. For instance, when pulling the lure through weeds or against obstruction there is no danger of a spoon causing the catch 5 to release the guard 10 so that the hook 8 or 9 may work its way loose. The rounded inner end 11 of the guard affords minimum friction for the clevis 15 when revolving about the member 1 against the guard, and with the spoon 13 properly proportioned relative to the guard there can be no interference between the action of the spoon and the hook.

The loop 2 may be in the form of a snap hook permitting of the lure being easily attached to the leader or line, also of such design as to permit of the spoon being easily removed and other spoons or like devices substituted therefor.

One embodiment of my invention has been illustrated but it is to be understood that the construction is susceptible to such changes as are permissible by the appended claims.

What I claim is:—

1. A lure comprising a member having a catch, a hook mountable over said catch on to said member, a guard slidable on said member and having a slot to receive the catch of said member, and a spoon loose on said member.

2. In a device of the class described, a member doubled upon itself to form a leg, a hook pressed over said leg and swingable in said doubled portion of said member, and an elongated tubular guard approximately completely enveloping said leg and the lower end of said member, and means locking said guard against displacement by pressure.

3. In a device of the class described, a member having an open eye with a leg and a catch, a hook having an eye threaded over the catch and leg into said member eye, and a tubular guard slidable on said member and over said leg, said guard serving as a keeper for said catch, and being locked by said catch against inadvertent displacement from said leg.

In testimony whereof I affix my signature in presence of two witnesses.

LOUIS J. EPPINGER.

Witnesses:
KARL H. BUTLER,
ANNA M. DORR.